(12) United States Patent
Ozark et al.

(10) Patent No.: US 6,264,024 B1
(45) Date of Patent: Jul. 24, 2001

(54) ARRANGEMENT FOR RETAINING COINS

(75) Inventors: L. John Ozark, Grosse Pointe Woods; Jeffery Godshall, Royal Oak, both of MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/516,075

(22) Filed: Mar. 1, 2000

(51) Int. Cl.$^7$ .................................................. A45C 1/00
(52) U.S. Cl. ...................... 206/0.8; 206/0.84; 206/563; 206/564
(58) Field of Search ................. 206/0.82, 0.83, 206/0.84, 455, 563, 564, 0.8

(56) References Cited

U.S. PATENT DOCUMENTS

| | | |
|---|---|---|
| 515,525 | 2/1894 | Jones . |
| 2,467,762 | 4/1949 | Marshalka ................. 133/6 |
| 2,497,365 | 2/1950 | McMurtry ................. 211/89 |
| 2,653,703 | 9/1953 | Krauss ..................... 206/84 |
| 2,800,360 | 7/1957 | Jenkins .................... 296/37 |
| 3,080,963 | 3/1963 | Rothgart ................... 206/84 |
| 3,138,244 | 6/1964 | White ...................... 206/81 |
| 3,245,522 | 4/1966 | Pearson ................... 206/81 |
| 3,329,277 | 7/1967 | Gaudino ................... 211/13 |
| 4,095,608 * | 6/1978 | Holmes ................... 206/0.82 |
| 4,239,051 * | 12/1980 | Holmes . |
| 4,240,544 * | 12/1980 | Barnhardt et al. .......... 206/0.82 |
| 4,537,439 | 8/1985 | Otani ..................... 296/37.9 |
| 4,568,117 | 2/1986 | McElfish et al. ............ 296/37.8 |
| 4,595,100 * | 6/1986 | Chabot .................... 206/0.82 |
| 4,708,386 | 11/1987 | Moore et al. .............. 296/37.8 |
| 4,836,365 | 6/1989 | Hall ....................... 206/0.83 |
| 4,915,273 | 4/1990 | Allen ..................... 224/30 A |
| 5,022,518 * | 6/1991 | Therrien .................. 206/0.82 |
| 5,024,411 | 6/1991 | Elwell .................... 248/311.2 |
| 5,096,152 | 3/1992 | Christiansen et al. ....... 248/311.2 |
| 5,114,014 * | 5/1992 | Ascalon ................... 206/0.84 |
| 5,267,893 | 12/1993 | Mangigian ................ 453/54 |
| 5,449,105 | 9/1995 | Schiff et al. .............. 224/281 |
| 5,855,308 | 1/1999 | Ziegler et al. ............. 224/281 |

* cited by examiner

Primary Examiner—David T. Fidei
(74) Attorney, Agent, or Firm—Mark P. Calcaterra

(57) ABSTRACT

An arrangement for retaining a plurality of coins includes a main body portion constructed of a resilient material. The main body portion defines a coin receiving opening for at least partially receiving a plurality of coins. The opening has a length and width. The width has a variable dimension for frictioning receiving the plurality of coins. In a preferred embodiment, the main body portion partially defines a generally cylindrical channel.

22 Claims, 3 Drawing Sheets

ARRANGEMENT FOR RETAINING COINS

BACKGROUND OF THE INVENTION

The present invention generally relates to an arrangement for retaining coins. More particularly, the present invention relates to an arrangement for retaining coins having a resilient main body portion defining a generally cylindrical channel with a variable diameter.

It is generally known to provide a motor vehicle with a console for securely retaining various items during travel. For example, many motor vehicle manufacturers provide a console with one or more areas adapted for supporting a beverage container. These areas are intended to secure a beverage container which is otherwise not sufficiently stable to withstand jostling encountered during normal vehicle travel due to an upright and cylindrical construction.

It is also desirable to securely and conveniently retain change within a motor vehicle for the payment of road tolls, parking fees, and other operator incurred expenses. U.S. Pat. No. 5,267,893 discloses a vehicle ashtray incorporating a coin retaining capacity. It is also known to incorporate certain coin holders within vehicle consoles.

In conventional holders, coins are inserted into cylindrical cavities having a diameter slightly greater than that of the coins they are designed to hold. While such arrangements may have become popular, they are associated with disadvantages. In this regard, if the coins are deposited into a cylindrical cavity having a larger diameter, the smaller coins have a tendency to rattle. In addition, recognizing that the modern marketplace is global, it can be appreciated that the coins of various nations have largely variable diameters and thicknesses that are often difficult to retain with conventional holders. As such, the need exists for a coin retention mechanism adapted to accommodate significant variation in coin diameters without allowing the retained coins to rattle.

SUMMARY OF THE INVENTION

In view of the foregoing, it is a general object of the present invention to provide a console adjacent to the driver for a motor vehicle having a coin holding portion.

It is a more particular object of the present invention to provide an arrangement for retaining coins capable of accepting coins of varying diameters and preventing rattle of those coins due to vibrations from a motor vehicle. The arrangement will retain various coin sizes, including domestic (one cent, five cents, ten cents, twenty five cents) as well as foreign coins without permitting the coins to rattle.

It is a further object of the present invention to provide a coin retention arrangement that may be integrally formed into the injection molded console for a motor vehicle which does not require any additional components.

The coin retention arrangement of the present invention preferably includes a partially cylindrical channel having a continuously variable diameter. The material to be used in defining the channel has a sufficient degree of resiliency for frictionally retaining one or more coins.

In one form, the present invention provides an arrangement for retaining a plurality of coins. The arrangement includes a main body portion constructed of a resilient material. The main body portion defines a coin receiving opening for at least partially receiving a plurality of coins. The opening has a length and width. The width has a variable dimension for frictioning receiving the plurality of coins. In a preferred embodiment, the main body portion partially defines a generally cylindrical channel.

BRIEF DESCRIPTION OF THE DRAWINGS

Further objects and advantages of the present invention will become apparent to those skilled in the art from reading the following descriptions and the accompanying drawings in which.

DETAILED DESCRIPTION OF THE PREFERRED EMBODIMENT

Figure 1:
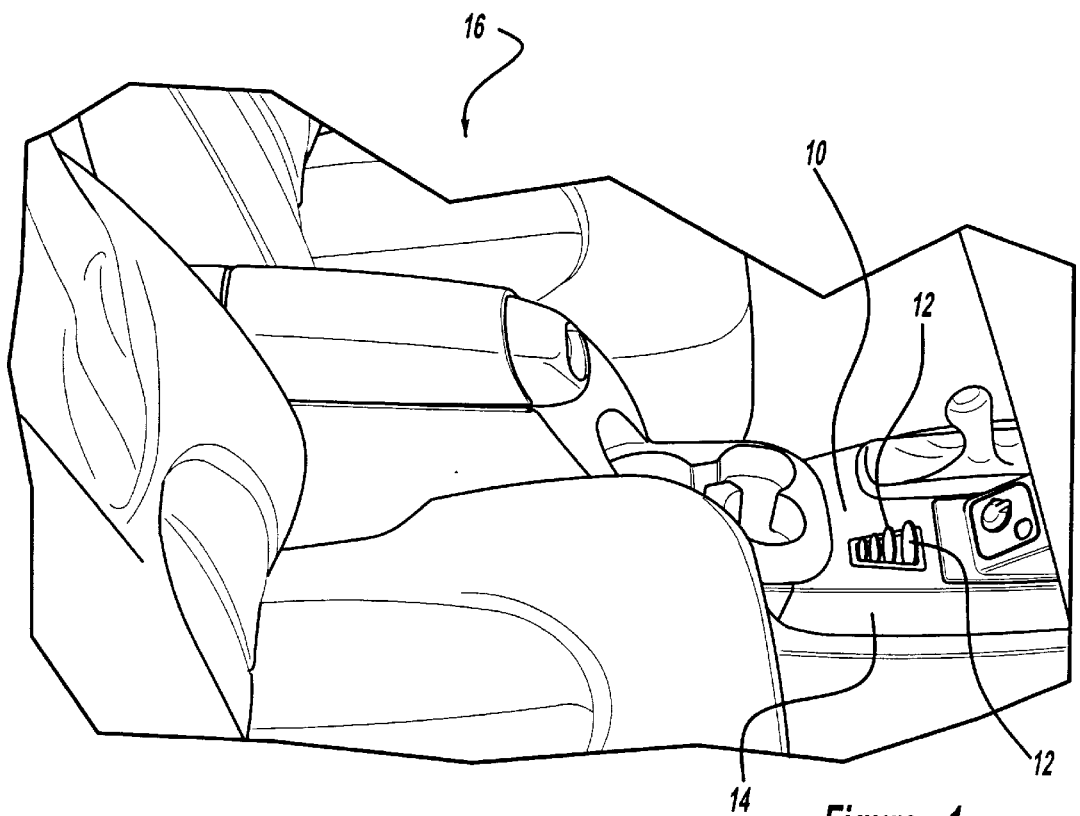
FIG. 1 is a view of an environmental view of a portion of a motor vehicle interior incorporating an arrangement for retaining coins constructed in accordance with the teachings of the preferred embodiment of the present invention.
Figure 2:
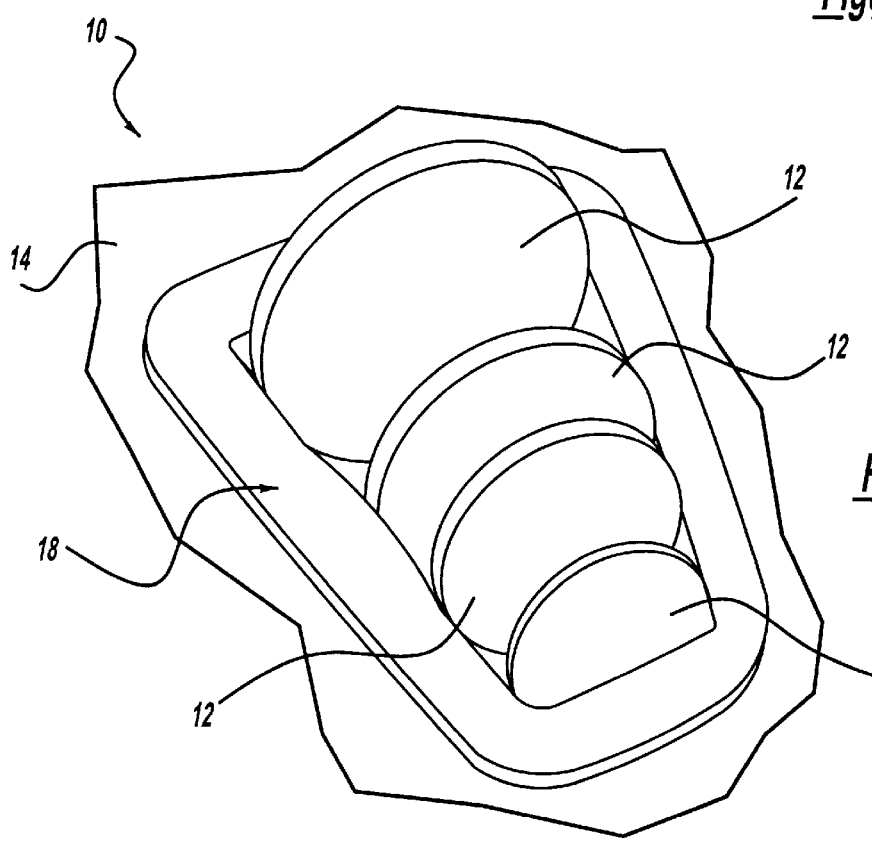
FIG. 2 is an enlarged perspective view of a portion of the console of FIG. 1, illustrating in further detail the arrangement for retaining coins of the preferred embodiment of the present invention.
Figure 3:
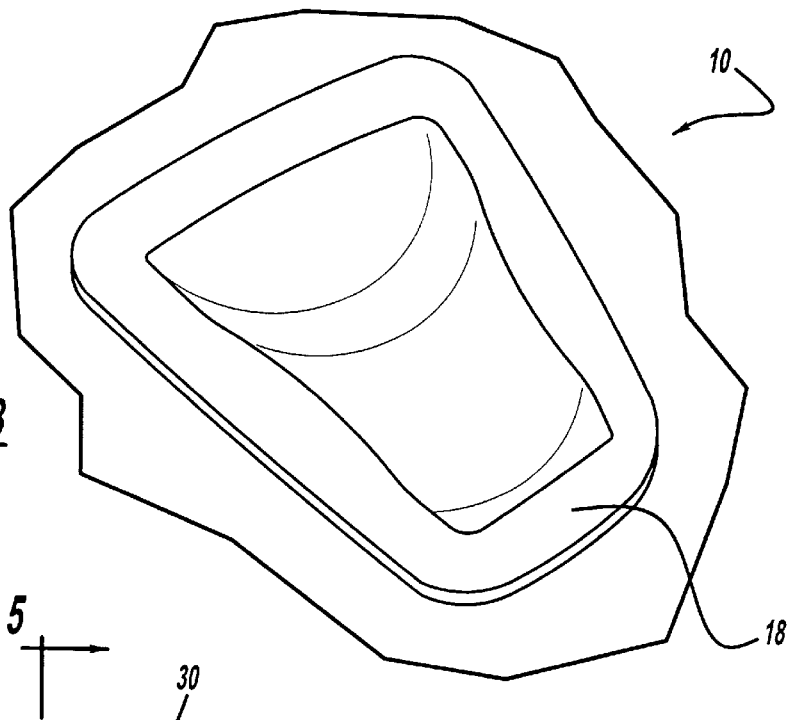
FIG. 3 is an enlarged perspective view similar to FIG. 2, shown without the coins of FIG. 2 for purposes of illustration.
Figure 4:
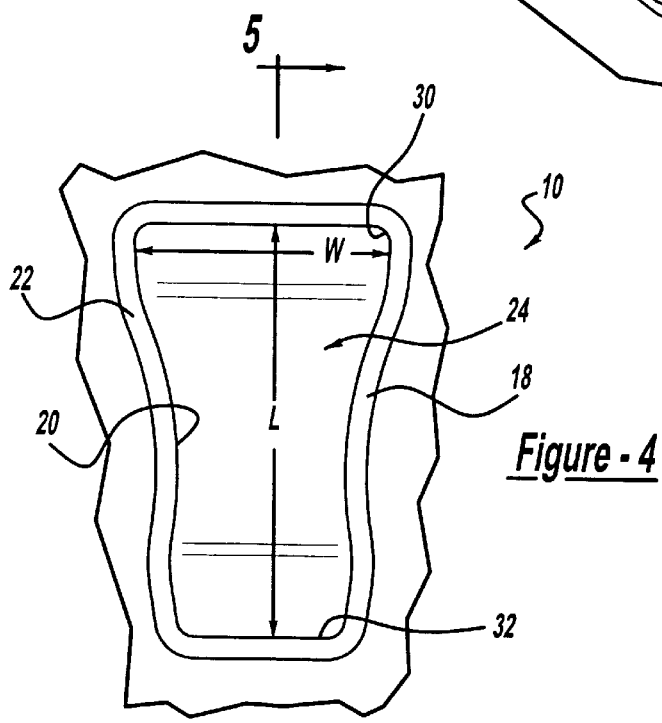
FIG. 4 is a top of the arrangement for retaining coins of the preferred embodiment of the present invention.
Figure 5:
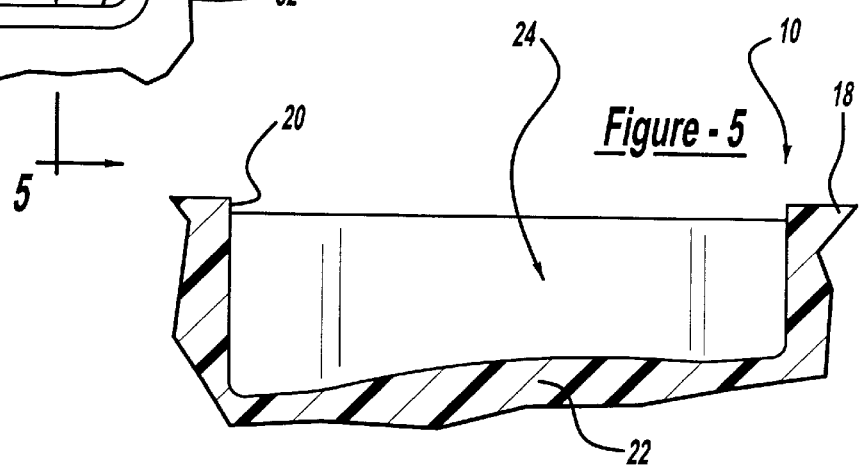
FIG. 5 is a cross-sectional view taken along the line 5—5 of FIG. 4.

With initial reference to the environmental view of FIG. 1, an arrangement for retaining coins constructed in accordance with the teachings of a preferred embodiment of the present invention is generally identified at reference numeral 10. The arrangement 10 is shown operatively associated with a plurality of coins 12. In the exemplary embodiment, the arrangement 10 is separately formed and inserted into an aperture of a center console 14 of a motor vehicle 16. It will become apparent to those skilled in the art that the arrangement 10 of the present invention may alternatively be formed as an integral portion of the console 14. As another alternative, the arrangement 10 may be formed in the dashboard, a glove box door, or virtually any other portion of the vehicle interior.

With continued reference to the environmental view of FIG. 1 and additional reference to FIGS. 2–5, the arrangement 10 of the present invention will be further described. The arrangement 10 is shown to include a main body portion 18 constructed of a resilient material. The main body portion 18 defines an opening 20 for receiving the plurality of coins 12. The opening 20 has a length l and width w. The width w has a variable dimension for frictionally retaining the plurality of coins 12.

In the preferred embodiment, the main body portion 18 includes a generally cylindrical wall 22 which defines a generally cylindrical cavity or channel 24. Further in the preferred embodiment, the generally cylindrical channel 24 has a variable diameter. As shown most particularly in the top view of FIG. 4 and the cross-sectional view of FIG. 5, the generally cylindrical channel 24 includes a first end or forward end 30 which tapers down to a second end or rear end 32. In the embodiment illustrated, the generally cylindrical wall 22 continuously curves in a direction parallel to the length l.

As shown in the environmental view of FIG. 1, the main body portion 18 of the arrangement 10 is constructed of a material having sufficient resiliency to frictionally retain one or more coins. One suitable material is Santoprene® which is commercially available from Monsanto Company of St. Louis, Mo. This material has proven to exhibit strength and resiliency characteristics suitable for the present application. However, it will be appreciated by those skilled in the art that alternative materials may be incorporated.

In use, an occupant (not shown) of the motor vehicle 16 partially inserts a coin 12 into the channel 24 such that the coin 12 is oriented substantially perpendicular to the length l. The coin 12 is translated in a direction generally parallel to the length l until the coin 12 is frictionally retained by the resiliency of the generally cylindrical wall 22. In this manner, the arrangement 10 of the present invention is able to accommodate coins 12 of various dimensions so that the coins 12 will not rattle or otherwise make undesirable noise during motor vehicle transit. Alternatively, the coin 12 can be inserted into the channel 24 in a direction substantially perpendicular to the length l at a point along the length l where the width w is slightly greater than the diameter of the coin 12.

Figure 6:
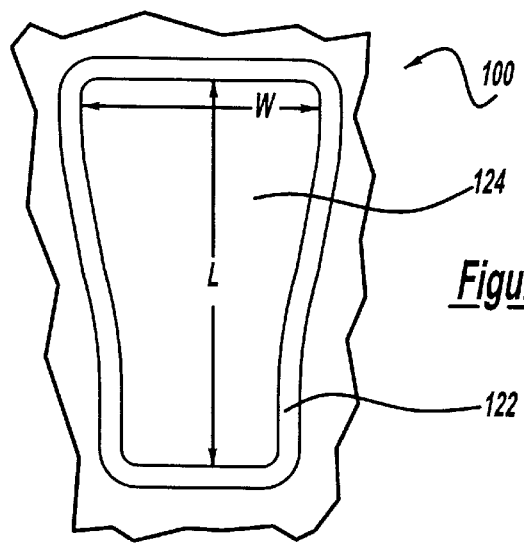
FIG. 6 is a top view of an arrangement for retaining coins constructed in accordance with the teachings of a first alternative embodiment of the present invention.

With reference to FIG. 6, a top view of an arrangement 100 for retaining coins constructed in accordance with the teachings of a first alternative embodiment of the present invention is illustrated. Similar to the arrangement 10, the arrangement 100 includes a generally cylindrical sidewall 122 defining a generally cylindrical channel 124. As with the preferred embodiment 10, the first alternative arrangement 100 includes a wall 122 which is arcuate in a direction generally parallel to its length l.

Figure 7:
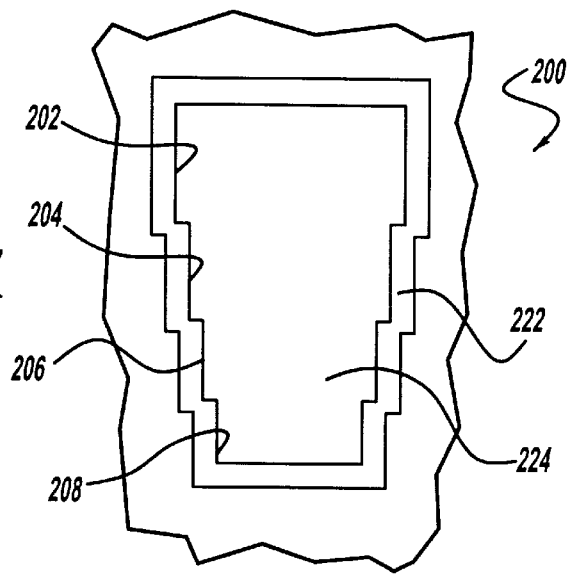
FIG. 7 is a top view of an arrangement for retaining coins constructed in accordance with the teachings of a second alternative embodiment of the present invention.

With reference to FIG. 7, a top view of an arrangement 200 for retaining coins constructed in accordance with the teachings of a second alternative embodiment of the present invention is illustrated. The second preferred arrangement 200 again includes a generally cylindrical wall 222 defining a generally cylindrical channel 224. The generally cylindrical wall has a plurality of stepped portions 202, 204, 206 and 208. The plurality of stepped portions 202–208 are concentrically arranged with each other.

Figure 8:
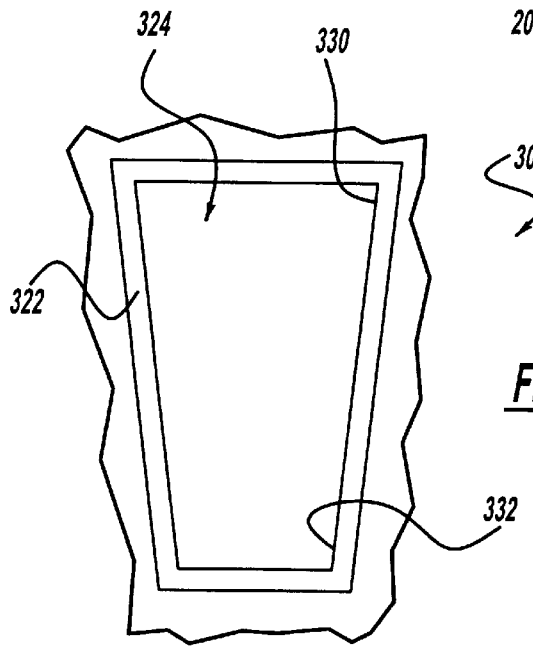
FIG. 8 is a top view of an arrangement with the teachings of a third alternative embodiment of the present invention.

Turning finally to FIG. 8, a top view of an arrangement 300 for retaining coins constructed in accordance with the teachings of a third alternative embodiment of the present invention is illustrated. The third alternative arrangement 300 again includes a generally cylindrical wall 322 defining a generally cylindrical channel 324. The generally cylindrical wall 322 has a general shape of a truncated cone which tapers from a first end 330 to a second end 332.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the description of the appended claims.

What is claimed is:

1. An arrangement for retaining a plurality of coins, the arrangement comprising:
   a main body portion constructed of a resilient material, the main body portion defining a coin receiving opening for at least partially receiving a plurality of coins;
   the opening having a first end, a second end, a length, and a width;
   the width having a continuously variable dimension between the first end and the second end for frictionally receiving the plurality of coins.

2. The arrangement for retaining a plurality of coins of claim 1, wherein the main body portion partially defines a generally cylindrical channel.

3. The arrangement for retaining a plurality of coins of claim 2, wherein the general cylindrical channel has a variable diameter.

4. The arrangement for retaining a plurality of coins of claim 2, wherein the main body portion includes a generally cylindrical wall defining the generally cylindrical channel.

5. The arrangement for retaining a plurality of coins of claim 4, wherein the generally cylindrical wall is arcuate in a direction parallel to the length.

6. The arrangement for retaining a plurality of coins of claim 4, wherein the generally cylindrical wall has a shape of a truncated cone.

7. The arrangement for retaining a plurality of coins of claim 4, wherein the generally cylindrical wall has a plurality of stepped portions concentrically arranged with each other.

8. The arrangement for retaining a plurality of coins of claim 1, wherein the main body portion is injection molded of plastic.

9. The arrangement for retaining a plurality of coins of claim 1, wherein the main body portion is constructed of polypropylene.

10. An arrangement for retaining a plurality of coins in combination with an interior component of a motor vehicle, the arrangement comprising:
    a main body portion constructed of a resilient material, the main body portion defining a coin receiving opening for at least partially receiving a plurality of coins;
    the opening having a first end, a second end, a length, and a width;
    the width having a continuously variable dimension between the first end and the second end for frictionally receiving the plurality of coins.

11. The arrangement for retaining a plurality of coins of claim 10, wherein the main body portion partially defines a generally cylindrical channel.

12. The arrangement for retaining a plurality of coins of claim 11, wherein the general cylindrical channel has a variable diameter.

13. The arrangement for retaining a plurality of coins of claim 11, wherein the main body portion includes a generally cylindrical wall defining the generally cylindrical channel.

14. The arrangement for retaining a plurality of coins of claim 13, wherein the generally cylindrical wall is arcuate in a direction parallel to the length.

15. The arrangement for retaining a plurality of coins of claim 13, wherein the generally cylindrical wall has a shape of a truncated cone.

16. The arrangement for retaining a plurality of coins of claim 13, wherein the generally cylindrical wall has a plurality of stepped portions concentrically arranged with each other.

17. The arrangement for retaining a plurality of coins of claim 10, wherein the main body portion is injection molded of plastic.

18. The arrangement for retaining a plurality of coins of claim 10, wherein the main body portion is constructed of polypropylene.

19. The arrangement for retaining a plurality of coins of claim 1, wherein the generally cylindrical wall is curvilinear along the length.

20. The arrangement for retaining a plurality of coins of claim 1, wherein the width decrease from the first end to an intermediate portion between the first and second ends and increases from the intermediate portion to the second end.

21. The arrangement for retaining a plurality of coins of claim 10, wherein the generally cylindrical wall is curvilinear along the length.

22. The arrangement for retaining a plurality of coins of claim 10, wherein the width decrease from the first end to an intermediate portion between the first and second ends and increases from the intermediate portion to the second end.

* * * * *